United States Patent [19]

Yoshitake et al.

[11] Patent Number: 5,377,304
[45] Date of Patent: Dec. 27, 1994

[54] MEMBERSHIP FUNCTION OBSERVATION DEVICE

[75] Inventors: Akio Yoshitake; Masanari Oh, both of Fukuoka, Japan

[73] Assignee: Rohm Co., Ltd., Kyoto, Japan

[21] Appl. No.: 993,843

[22] Filed: Dec. 21, 1992

[30] Foreign Application Priority Data

Dec. 28, 1991 [JP] Japan .................................. 3-359887

[51] Int. Cl.⁵ ........................ G06G 7/00; G05B 11/01
[52] U.S. Cl. .......................................... 395/3; 395/900
[58] Field of Search ............................ 395/3, 61, 900

[56] References Cited

U.S. PATENT DOCUMENTS

| | | | |
|---|---|---|---|
| 3,909,597 | 9/1975 | Dunn et al. | 395/141 |
| 4,719,582 | 1/1988 | Ishida et al. | 395/900 |
| 5,121,466 | 6/1992 | Zhang | 395/3 |
| 5,126,600 | 6/1992 | Zhang | 395/900 |
| 5,230,227 | 7/1993 | Kondoh et al. | 68/12.02 |

Primary Examiner—Allen R. MacDonald
Assistant Examiner—Stuart B. Shapiro
Attorney, Agent, or Firm—Oliff & Berridge

[57] ABSTRACT

A membership function observation device capable of reducing the number of observation terminals and reducing the time required for measurement and control so that the interrelationship among membership functions can be understood. Pairs of membership functions output from the adjacent twos of a plurality of membership function generator circuits are supplied to respective minimum value circuits to obtain respective minimum values. These minimum values are supplied to a first maximum value circuit to obtain a maximum value. In turn, all the membership functions are supplied to a second maximum value circuit to obtain the maximum value of the membership functions. The outputs of the first and second maximum value circuits are synthesized to observe all the original membership functions at the same time.

6 Claims, 4 Drawing Sheets

MEMBERSHIP FUNCTION OBSERVATION DEVICE

BACKGROUND OF THE INVENTION i) Field of the Invention

The present invention relates to a membership function observation device for use in a fuzzy hardware. Such an observation device may be used as a control using a fuzzy logic, a pattern recognition, a decision making or the like.

ii) Description of the Related Arts

In a conventional fuzzy system, as shown in FIG. 7, a plurality of membership function generator (MF GEN) circuits 1-1 to 1-$n$ are required. A membership function in each membership function generator circuit must be determined and controlled according to a purpose by a user, and thus a means for observing an output of each membership function generator circuit is required.

In the conventional fuzzy system shown in FIG. 7, the membership function generator circuits 1-1 to 1-$n$ are provided with respective observation terminals t1 to tn. While respective reference voltages V1 to Vn are given to the membership function generator circuits 1-1 to 1-$n$, an input voltage $V_{IN}$ to be input to the membership function generator circuits 1-1 to 1-$n$ is changed, and output voltages $V_{OUT1}$ to $V_{OUTn}$ output from the membership function generator circuits 1-1 to 1-$n$ are measured on the respective observation terminals t1 to tn to observe each of the membership functions.

However, in the conventional fuzzy system, since the corresponding number of the observation terminals to the membership function generator circuits are required, a large number of the observation terminals are required. Also, since it is necessary to connect respective lead wires and the like onto the observation terminals in the measurement, a good amount of time and labor is needed for the observation. Further, since the measurement must be repeated in numbers corresponding to the membership function generator circuits, it necessarily takes a long time for the measurement and the control. Also, since the membership functions are independently exhibited, it is not easy to understand the interrelationship among the membership functions.

SUMMARY OF THE INVENTION

It is therefore an object of the present invention to provide a membership function observation device in view of the aforementioned problems of the prior art, which is capable of reducing a number of observation terminals to reduce a number of steps required in an observation operation, reducing time required for a measurement and a control, and readily grasping interrelationship among membership functions.

In order to achieve this object, according to the present invention, the following construction is provided. That is, in a fuzzy arithmetic circuit including a plurality of membership function generator circuits for producing membership functions depending on different reference voltages and a common input voltage, a membership function observation device comprising: a plurality of minimum value circuits for comparing pairs of membership functions output from the adjacent twos of the membership function generator circuits to output respective minimum values of the pairs of membership functions; a first maximum value circuit for comparing the outputs of the minimum value circuits to output a maximum value of the outputs; a second maximum value circuit for comparing the membership functions output from the membership function generator circuits to output a maximum value of the membership functions; and multirace observation means for synthesizing outputs of the first and second maximum value circuits to display a synthesized result.

According to the present invention, each pair of membership functions produced by the adjacent twos of the membership function generator circuits are supplied to each minimum value circuit to obtain the minimum value of the pair. These minimum values represent the overlapped portions of the adjacent twos of the membership functions. These minimum values are supplied to the first maximum value circuit to obtain the maximum value. This maximum value represents all the overlapped portions. On the other hand, all the membership functions are supplied to the second maximum value circuit to obtain the maximum value of the membership functions. This maximum value represents the maximum value of all the membership functions. By supplying the outputs of the first and second maximum value circuits to the respective input terminals of the multirace observation means such as a triggered sweep two-race oscilloscope, the membership functions are visually synthesized so as to observe the plurality of original membership functions at the same time.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
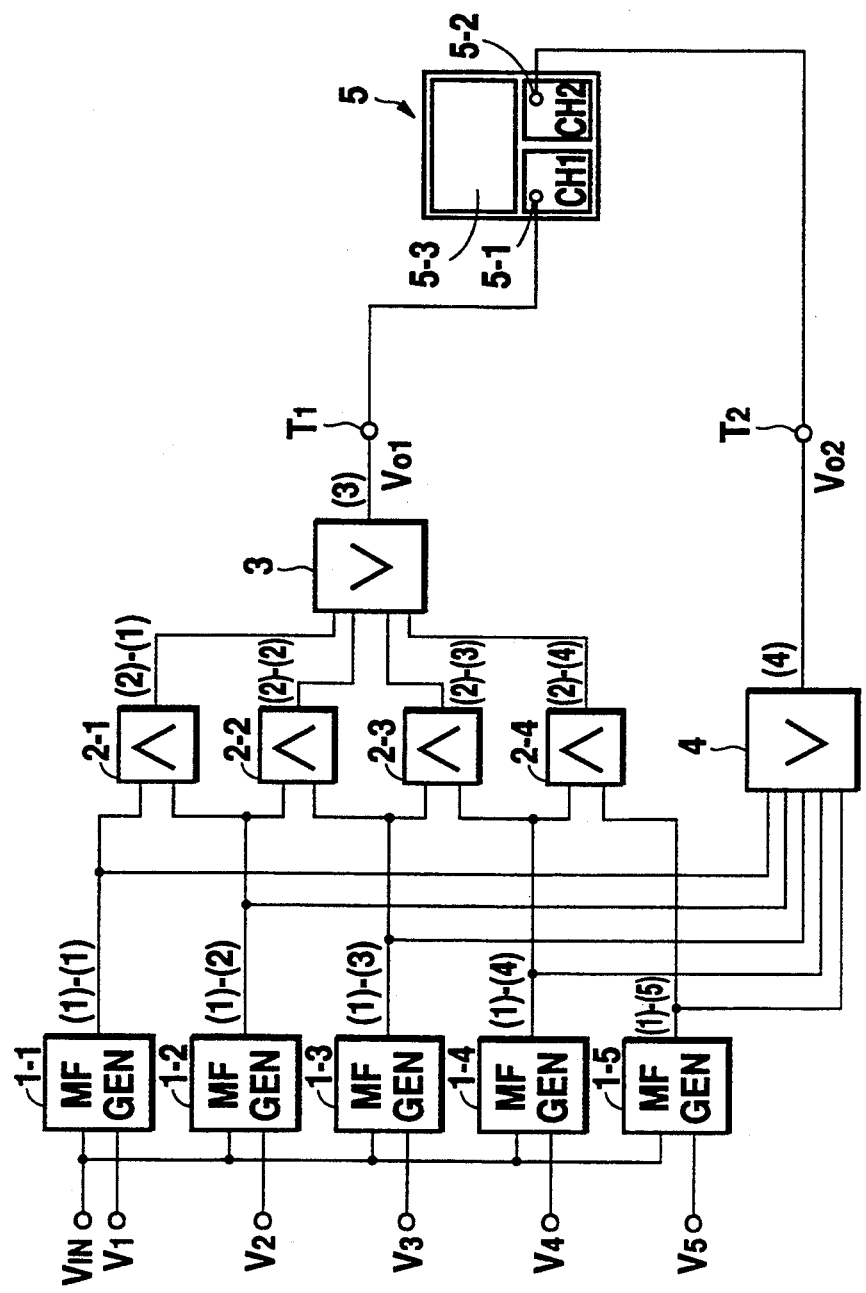
FIG. 1 is a block diagram of a membership function observation device according to the present invention.

Referring now to the drawings, wherein like reference characters designate like or corresponding parts throughout the views and thus the repeated description thereof can be omitted for brevity, there is shown in FIG. 1 one embodiment of a membership function observation device according to the present invention. FIGS. 2 to 6 are explanatory views of membership functions. In this embodiment, for better understanding of the present invention, a number of membership function generator circuits is determined to 5.

In FIG. 1, reference voltages V1 to V5 of different values are applied to five membership function generator(MFGEN) circuits 1-1 to 1-5, respectively, and an input voltage $V_{IN}$ is also applied in common to the membership function generator circuits 1-1 to 1-5. The membership function generator circuits 1-1 to 1-5 output membership functions (1)-(1), (1)-(2), (1)-(3), (1)-(4) and (1)-(5), and the adjacent two membership functions are mutually overlapped in their both end portions. The pairs of the adjacent two membership functions are supplied to respective four minimum value circuits (MIN) 2-1 to 2-4. Each of the minimum value circuits 2-1 to 2-4 outputs the minimum one of the two input values. Then, outputs (2)-(1), (2)-(2), (2)-(3) and (2)-(4) of the minimum value circuits 2-1 to 2-4 are fed to a first maximum value circuit (MAX) 3 provided with a first observation terminal T1, and the first maximum value circuit 3 outputs the maximum value Vo1 of the four outputs (2)-(1), (2)-(2), (2)-(3) and (2)-(4) to the first observation terminal T1. The five membership functions (1)-(1), (1)-(2), (1)-(3), (1)-(4) and (1)-(5) of the membership function generator circuits 1-1 to 1-5 are also supplied to a second maximum value circuit (MAX) 4 provided with a second observation terminal T2, and the second maximum value circuit 4 outputs the maximum value Vo2 of the five membership functions (1)-(1), (1)-(2), (1)-(3), (1)-(4) and (1)-(5) to the second observation terminal T2. The first and second observation terminal T1 and T2 are to be connected with a multirace observation device, for example, first and second channel input terminals 5-1 and 5-2 of a triggered sweep two-race oscilloscope 5 having an observation display screen 5-3.

Next, the operation of the above-described membership function observation device will now be described in connected with FIGS. 2 to 6. In this embodiment, in order to simplify the explanation, it is considered that the membership functions themselves are the outputs of the membership function generator circuits 1-1 to 1-5.

Figure 2:
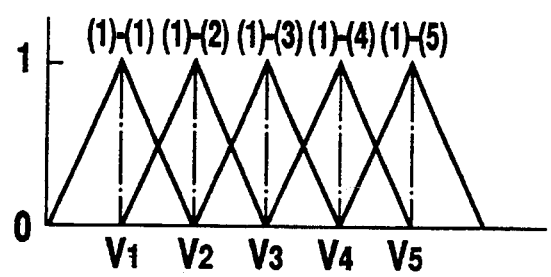
FIG. 2 is a graphical representation showing membership functions in membership function generator circuits used in the membership function observation device shown in FIG. 1.
Figure 3:
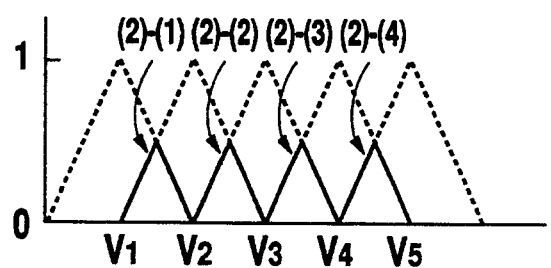
FIG. 3 is a graphical representation showing outputs of minimum circuits of the membership function observation device when the membership functions shown in FIG. 2 are input.
Figure 4:
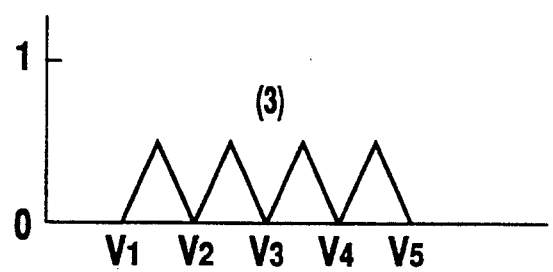
FIG. 4 is a graphical representation showing outputs of a first maximum circuit of the membership function observation device when the membership functions shown in FIG. 3 are input.
Figure 5:
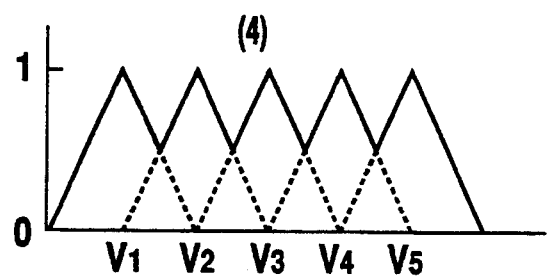
FIG. 5 is a graphical representation showing outputs of a second maximum circuit of the membership function observation device when the membership functions shown in FIG. 2 are input.

First, the pairs of the adjacent two values of the membership functions (1)-(1), (1)-(2), (1)-(3), (1)-(4) and (1)-(5) output from the membership function generator circuits 1-1 to 1-5 are supplied to the respective minimum value circuits 2-1 to 2-4, and the minimum value circuits 2-1 to 2-4 calculate the minimum one values of the input values to obtain the outputs (2)-(1), (2)-(2), (2)-(3) and (2)-(4). When the membership functions (1)-(1), (1)-(2), (1)-(3), (1)-(4) and (1)-(5) shown in FIG. 2 are output from the membership function generator circuits 1-1 to 1-5, the outputs (2)-(1), (2)-(2), (2)-(3) and (2)-(4) shown by solid lines in FIG. 3 are obtained in the minimum value circuits 2-1 to 2-4. Then, the outputs (2)-(1), (2)-(2), (2)-(3) and (2)-(4) are input to the first maximum value circuit 3 calculates the maximum value V1 and the membership function (3) shown in FIG. 4 is output from the first observation terminal T1. In turn, the five membership functions (1)-(1), (1)-(2), (1)-(3), (1)-(4) and (1)-(5) are supplied to the second maximum value circuit 4, and the second maximum value circuit 4 calculates the maximum value V2 to output the membership function (4) shown in FIG. 5 from the second observation terminal T2.

The output of the first observation terminal T1 is supplied to the first channel input terminal 5-1 of the triggered sweep two-race oscilloscope 5 and the output of the second observation terminal T2 is fed to the second channel input terminal 5-2 of the same. Hence, on the observation display screen 5-3 of the two-race oscilloscope 5, the membership function (3) and the membership function (4) aligned in the vertical direction are displayed. Also, by adjusting the vertical display position of the first or second channel of the two-race oscilloscope 5, the membership function (3) and the membership function (4) are displayed in a continuous form, as shown in FIG. 6.

Figure 6:
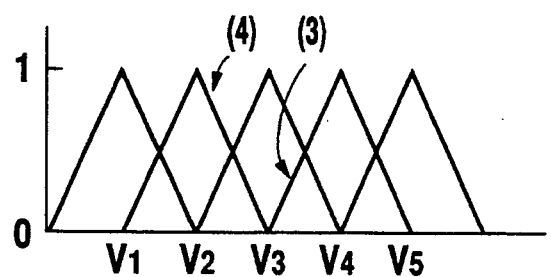
FIG. 6 is a graphical representation showing a synthesized result of the membership functions shown in FIG. 4 and the membership functions shown in FIG. 5.
Figure 7:
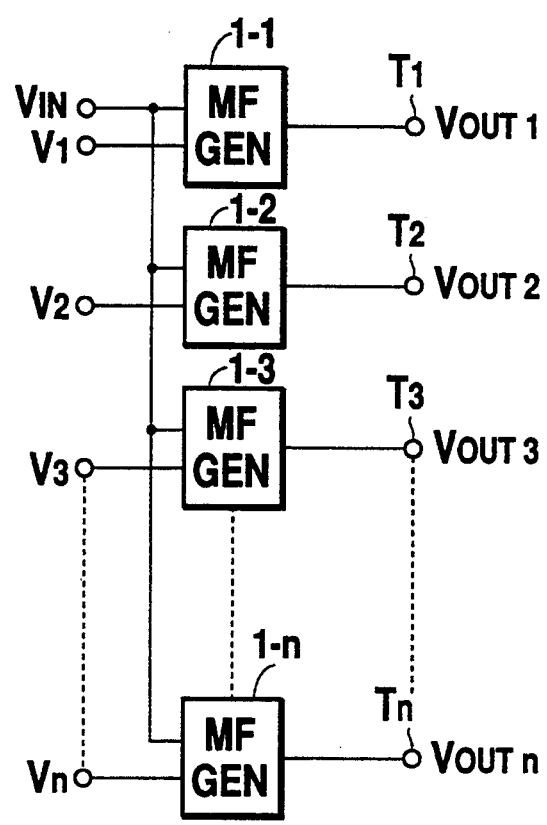
FIG. 7 is a block diagram of a conventional fuzzy system for explaining a conventional membership function observation device.

As described above, according to the present invention, by visually synthesizing the two membership functions (3) and (4) output from the first and second maximum value circuits 3 and 4, as shown in FIG. 6, the five membership functions (1)-(1), (1)-(2), (1)-(3), (1)-(4) and (1)-(5) produced in the five membership function generator circuits 1-1 to 1-5 can be observed at one time. Further, since the terminals leading the outside for the observation are only two, it is possible to observe all the membership functions by the less terminal number.

Further, when a sawtooth waveform signal as the input voltage $V_{IN}$ is used, it is sufficient to carry out a sweep of the oscilloscope in synchronism with the sawtooth waveform signal. Also, the input voltage $V_{IN}$ itself can be an X-axis input of the oscilloscope.

Furthermore, by using a multipen recorder, an X-Y plotter or the like as the multirace observation device, the membership functions can be directly printed on a recording paper. In this case, it is sufficient to change the input voltage $V_{IN}$ once.

Although the five membership function generator circuits are used in the above-described embodiment, it is readily understood that, when an n number of membership function generator circuits are used, by using an (n−1) number of minimum value circuits, the structure can be constructed in the same manner as described above.

According to the present invention, the following effects can be obtained.

(1) Since the number of the observation terminals leading the outside can be reduced, a cost of the circuit can be reduced.

(2) Since the number of the observation terminals can be reduced, a step number of a lead wire connection to the observation terminals for the measurement can be reduced.

(3) Since all the membership functions can be observed at the same time, the observation time can be reduced and the interrelationship among the membership functions can be readily grasped.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A fuzzy arithmetic circuit comprising:
a plurality of membership function generator circuits, each producing a membership function based on one of a plurality of different reference voltages and a common input voltage; and
a membership function observation device comprising:

a plurality of minimum value circuits, each comparing outputs from at least two membership function generator circuits and outputting a respective minimum value of the outputs of the at least two membership function generator circuits;

a first maximum value circuit comparing outputs from the plurality of minimum value circuits and outputting a maximum value of the outputs of the plurality of minimum value circuits;

a second maximum value circuit comparing outputs from the plurality of membership function generator circuits and outputting a maximum value of the outputs of the plurality of membership function generator circuits; and multirace observation means for synthesizing outputs of the first maximum value circuit and the second maximum value circuit and for displaying a synthesized result.

2. The fuzzy arithmetic circuit of claim 1, wherein the multirace observation means is a triggered sweep two-race oscilloscope.

3. The fuzzy arithmetic circuit of claim 1, wherein the multirace observation means is a multipen recorder.

4. The fuzzy arithmetic circuit of claim 1, wherein the multirace observation means is an X-Y plotter.

5. The fuzzy arithmetic circuit of claim 2, wherein the common input voltage is a sawtooth waveform signal, and a sweep of the triggered sweep two-race oscilloscope is synchronous with the sawtooth waveform signal.

6. The fuzzy arithmetic circuit of claim 2, wherein the common input voltage is connected to an X-axis input of the triggered sweep two-race oscilloscope.

* * * * *